United States Patent [19]
Kawamoto et al.

[11] Patent Number: 5,982,546
[45] Date of Patent: Nov. 9, 1999

[54] REFLECTING FILM AND REFLECTOR MAKING USE OF THE SAME

[75] Inventors: Satoshi Kawamoto; Yumi Gotoh; Shin Fukuda, all of Kanagawa-ken; Nobuhiro Fukuda, Yamaguchi-ken, all of Japan

[73] Assignee: Mitsui Chemicals, Inc., Tokyo, Japan

[21] Appl. No.: 08/655,762

[22] Filed: May 30, 1996

[30] Foreign Application Priority Data

May 31, 1995 [JP] Japan ..................... 7-133515
Sep. 28, 1995 [JP] Japan ..................... 7-251182

[51] Int. Cl.$^6$ .......................... G02B 5/30
[52] U.S. Cl. .................. 359/584; 359/582; 359/585; 428/912.2
[58] Field of Search ................. 359/360, 361, 359/582, 585, 584; 428/912.2

[56] References Cited

U.S. PATENT DOCUMENTS

| | | | |
|---|---|---|---|
| 5,118,540 | 6/1992 | Hutchinson | 359/360 |
| 5,251,064 | 10/1993 | Tennant et al. | 359/361 |
| 5,276,600 | 1/1994 | Takase et al. | 362/320 |
| 5,361,172 | 11/1994 | Schissel et al. | 359/883 |
| 5,424,876 | 6/1995 | Fujii | 359/585 |
| 5,589,280 | 12/1996 | Gibbons et al. | 359/585 |

FOREIGN PATENT DOCUMENTS

| | | | |
|---|---|---|---|
| 4322512 | 1/1994 | Germany | B05D 7/02 |
| 49-107547 | 10/1974 | Japan . | |
| 1-279201 | 11/1989 | Japan | G02B 5/08 |
| 5-162227 | 6/1993 | Japan | B32B 7/02 |
| WO94/18003 | 8/1994 | WIPO | B32B 31/00 |
| WO94/26950 | 11/1994 | WIPO | C23C 14/20 |

OTHER PUBLICATIONS

Patent Abstracts of Japan, vol. 018, No. 241 (P–1733), May 9, 1994 & JP 06 027309 (Enplas Corp), Feb. 4, 1994 *Abstract*.

Patent Abstracts of Japan, vol. 018, No. 220 (M–1595), Apr. 20, 1994 & JP 06 015774 (Mitsui Toatsu Chem., Inc.), Jan. 25, 1994 *Abstract; Figure*.

L.J. Gerenser, "Photoemission Investigation of Silver/Poly-(Ethylene Terephthalate) Interfacial Chemistry: The Effect of Oxygen–Plasma Treatment", *J. Vac. Sci. Technol*, A 8 (5), Sep./Oct. 1990, pp. 3682–3691.

*Primary Examiner*—Cassandra C. Spyrou
*Assistant Examiner*—John Juba, Jr.
*Attorney, Agent, or Firm*—Burns, Doane, Swecker & Mathis, L.L.P.

[57] ABSTRACT

A reflecting film has at least a transparent polymer film and a thin silver layer applied on the transparent polymer film to reflect light entered from a side of the transparent polymer film. The reflecting film retains a reflectance of at least 90% to visible light even after the reflector is exposed for 300 hours at a reflecting film temperature of 100° C. and an exposure intensity of 500 mW/cm$^2$ to artificial sunlight from which light of 390 nm and shorter in wavelength has been eliminated. For fabricating the reflecting film, a surface of the transparent polymer film is preferably treated with a metal-containing plasma, then the thin-silver layer is deposited on the treated surface. A reflector making use of the reflecting film is also disclosed.

25 Claims, 9 Drawing Sheets

REFLECTING FILM AND REFLECTOR MAKING USE OF THE SAME

BACKGROUND OF THE INVENTION a) Field of the Invention

This invention relates to a reflecting film formed by applying high-reflectance silver as a reflecting layer on a transparent polymer film, and also to a reflector making use of the reflecting film.

b) Description of the Related Art

Reflecting film s and reflectors, which reflect incident light, are used in a variety of applications such as lamp houses for use as backlights in liquid crystal displays, reflecting mirrors for use in printers and facsimile systems, reflecting plates in lighting equipments such as fluorescent lamps, reflecting plates for use in combination with photographic strobes, and mirrors of makeup compacts. In fields where a small thickness and light weight are required or workability into a desired shape is needed, reflectors of the construction that a metal layer is arranged as a reflecting layer on a transparent polymer film and light is allowed to enter from a side of the transparent film are widely employed.

Silver has a high reflectance to light in both the visible range and the infrared range, and its electrical and thermal conductivities are the highest among metals. Silver therefore attracts attention as a visible-light reflecting material, heat reflecting material and electric wiring material. Although silver is generally free from oxidation in the atmosphere, it reacts with sulfur dioxide gas and sulfur in the atmosphere so that black silver sulfide is formed. Further, it also reacts with ozone to form black silver oxide (AgO).

As a method for preventing the conversion of silver into the sulfide form in the atmosphere, it is known to form silver into an alloy. For example, for electrical contacts, silver containing 3–40 wt. % of Cu, Cd-containing silver and silver containing 10 wt. % of Au are employed. For dental purpose, silver containing 25 wt. % of Pd and 10 wt. % of Cu is used. For ornamentation purposes, silver containing 5–20 wt. % of Cu is used. Performance of silver in actual use is well-known to those skilled in the art. Darely indicating a publication which contains a detailed description about the performance of silver in actual use, reference may be made, for example, to Yuzo Yamamoto (1982), "Kikinzoku No Jissai Chishiki (Practical Knowledge on noble Metals)", 72–153, The Toyo Keizai Shinposha Ltd., Tokyo, Japan.

As another method for preventing the conversion of silver into the sulfide form, it is also known, besides the above-mentioned alloying method, to cover silver with a metal layer, a metal oxide layer, a metal sulfide layer, an alloy layer, a primer resin layer, a protective resin layer or the like. For example, Japanese Patent Laid-Open No. 107547/1974 discloses a method in which subsequent to formation of silver as a film on glass, an alloy layer composed of Cu and Sn is applied, followed by application of a resin layer, whereby silver is prevented from corrosion and enhanced scratch resistance is imparted. The present inventors also disclosed in Japanese Patent Laid-Open No. 279201/1989 that a thin-film silver layer can be protected from deterioration by light, heat, gas and/or the like by arranging metal layers of aluminum, titanium or the like on both sides of the thin-film silver layer.

In recent years, high-reflectance reflectors making use of silver as reflecting layers have been increasingly employed in products led by lamp reflectors of backlight sources for liquid crystal displays and including reflectors of fluorescent lamps. These reflecting members are so-called reflecting plates (silver-based reflecting plates) having a layer construction of PET (polyethylene terephthalate)/thin-film silver layer/adhesive layer/aluminum plate or so-called reflecting sheets (silver-based reflecting sheets) having a layer construction of PET/thin-film silver layer/adhesive layer/thin-film aluminum layer/PET/light-shielding layer. In these reflectors, the covering of silver with PET, a transparent polymer film, and an adhesive layer has succeeded in protecting silver from its conversion into the sulfide form and oxidation upon exposure to the atmosphere, said conversion and oxidation having remained as problems for many years, and hence retaining a high reflection. For example, when some samples of the above-mentioned silver-based reflecting plates and silver-based reflecting sheets were left over for 1,000 hours in an constant-temperature chamber controlled at 80° C., no discoloration into a black or yellow color due to the formation of the sulfide or the like was observed and their reflectances were not reduced. When some other samples of these silver-based reflecting plates and silverbased reflecting sheets were left over for 1,000 hours in an air-conditioned chamber controlled at 60° C. and 85% RH (relative humidity), neither discoloration nor reduction in reflection was observed either.

In addition, the present inventors also conducted an ultraviolet (UV) ray exposure test on further samples of the above-mentioned silver-based reflecting plates and silver-based reflecting sheets under a "QUV Testing Equipment" (trade name) manufactured by Q-PANEL Corp., U.S.A. As a result, their reflecting surfaces were found to be discolored into a purplish red color. This color is apparently different from any conventionally-known color formed by the conversion of silver into the sulfide form or by oxidation, such as black, yellowish brown or yellow color, and is also different from a color produced through yellowing as a result of deterioration of the PET film itself under ultraviolet rays. The present inventors therefore decided to call a reduction in the reflectance of a thin-film silver, which takes place under exposure to light (ultraviolet rays), "photodeterioration". With a view to avoiding this photodeterioration, the present inventors disclosed in Japanese Patent Laid-Open No. 162227/1993 a reflector improved in the durability against light (ultraviolet rays), heat and the like without any substantial reduction in the reflectance to visible light. This reflector is obtained by applying a thin film of a silver-containing metal on one side of a flexible substrate having a transmittance of 10% or lower for light ranging from 300 nm to 380 nm in wavelength.

The present inventors proceeded with a further investigation about UV deterioration of reflectors each of which had a stacked structure of transparent polymer film/silver. As a result, it was surprisingly found that, even when exposed to visible light from which ultraviolet rays had been eliminated, the reflecting surfaces became also discolored into a purplish red color as in the case of exposure to ultraviolet rays. Moreover, the above photodeterioration by visible light was found to proceed very fast at high temperatures although it proceeded very slowly at room temperature. Accordingly, this deterioration will hereinafter be called "photothermal deterioration".

FIG. 1 is a transmission electron micrograph (cross-sectional TEM picture) of a cross-section of a sample which underwent photothermal deterioration. The sample is a reflecting film of the construction that a thin-film silver layer is arranged on PET, and was subjected to an accelerated deterioration test (accelerated photothermal deterioration test) for 300 hours at an exposure intensity of 500 mW/cm$^2$ and a sample temperature of 100° C. The thin-film silver layer is observed to have partially separated from the PET. Further, particles of several tens nanometers in diameter are observed at an interface between the PET and the thin-film silver layer, thereby indicating intrusion of these particles in the PET. As a result of an analysis of these particles by electron probe micro-analyzer (EPMA), they were found to be silver. Incidentally, a large void which is seen on a right-hand side in the picture is a void which is contained in a resin used for the fixing of the sample.

According to the above findings of the present inventors, characteristics of photothermal deterioration can be summarized as follows: (1) photothermal deterioration is a deteriorative phenomenon specific to an interface between a polymer film and a thin-film silver layer; (2) an analysis of a photothermally-deteriorated portion by EPMA does not detect any of sulfur, chlorine and oxygen which are all detected in conventional deterioration of silver; and (3) no deterioration is observed in the thin-film silver layer at any portion thereof other than the interface between the polymer film and the thin-film silver layer.

SUMMARY OF THE INVENTION

An object of the present invention is to prevent discoloration of a reflector by photothermal deterioration found by the present inventors. More specifically, it is an object of the present invention to provide a reflecting film which can avoid discoloration at its reflecting surface, said discoloration being clearly observed when exposed to light at high temperatures, and which can hence retain a reflectance of 90% or higher even after exposed to light.

Another object of the present invention is to provide a reflector which can avoid discoloration at its reflecting surface, said discoloration being clearly observed when exposed to light at high temperatures, and which can hence retain a reflectance of 90% or higher even after exposed to light.

With a view to resolving such problems, the present inventors have proceeded with extensive research. As a result, it has been found that by application of a surface treatment with a metal-containing plasma to one side of a transparent polymer film and subsequent formation of a thin-film silver layer on the thus-treated surface make it possible to prevent discoloration, which would otherwise occur at an interface between the transparent polymer film and the thin-film silver layer, and also to realize a reflector having a reflectance of 90% or higher even after a 300-hour accelerated photothermal deterioration test. The above finding has led to the completion of the present invention.

The former object of the present invention can therefore achieved by a reflecting film having at least a transparent polymer film and a thin-film silver layer applied on said transparent polymer film to reflect light entered from a side of said transparent polymer film, wherein said reflecting film retains a reflectance of at least 90% to visible light even after said reflecting film is exposed for 300 hours at a reflector temperature of 100° C. and an exposure intensity of 500 mW/cm$^2$ to artificial sunlight from which light of 390 nm and shorter in wavelength has been eliminated.

Further, the latter object of the present invention can be achieved by a reflector comprising a base material and the above reflecting film applied via an adhesive layer on said base material with said thin silver layer of said reflecting film being arranged opposite said adhesive layer.

DETAILED DESCRIPTION OF THE PREFERRED EMBODIMENTS

Figure 1:
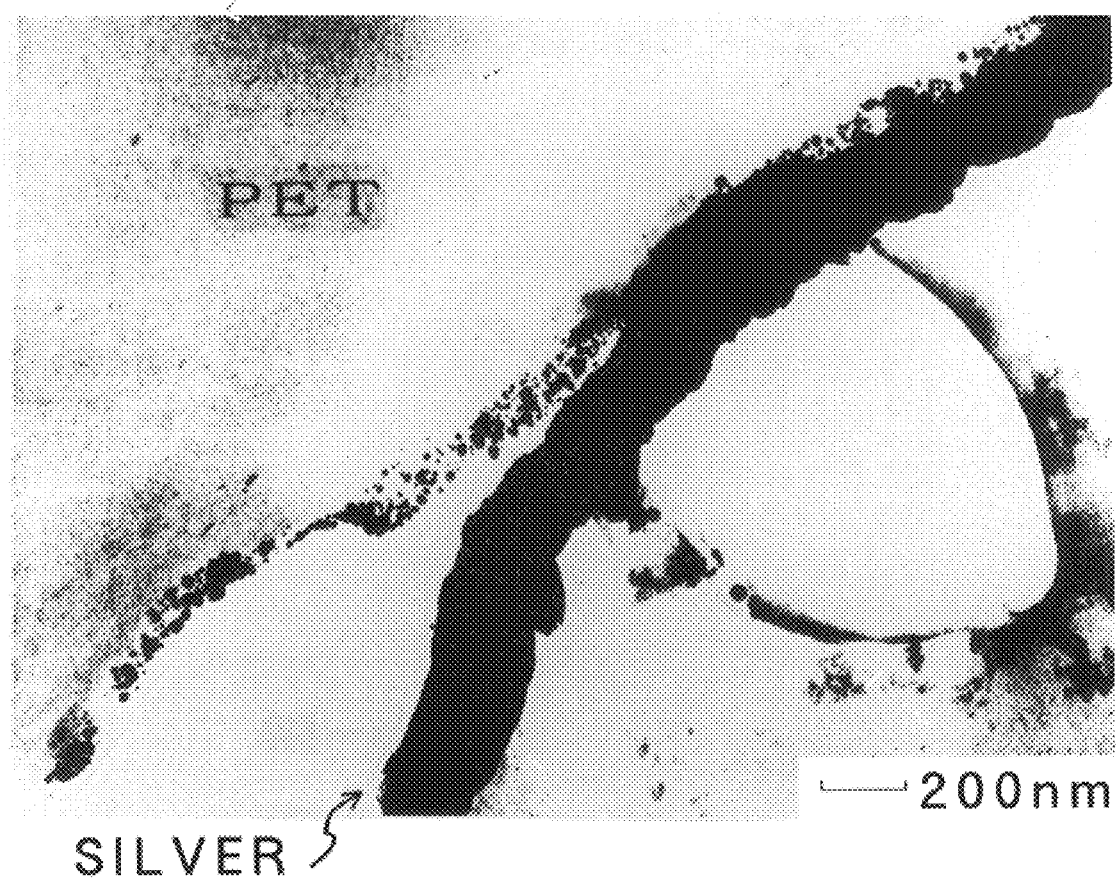
FIG. 1 is a transmission electron micrograph of a cross-section of a photothermally-deteriorated reflecting film.
Figure 2:
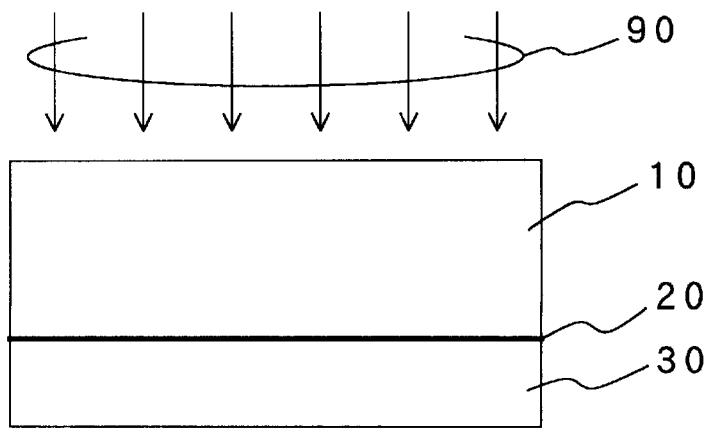
FIG. 2 is a cross-sectional view showing the construction of a reflecting film according to a preferred embodiment of the present invention.

Among reflecting films according to the present invention, one having the simplest construction is shown in FIG. 2. The reflecting film in FIG. 2 is formed of a transparent polymer film 10 and a thin-film silver layer 30 applied thereon. Of surfaces of the transparent polymer film 10, the surface which forms an interface with the thin-film silver layer 30 has been subjected in advance to surface treatment with a metal-containing plasma so that the surface has been converted to a treated surface 20. Subsequent to the formation of the treated surface 20, the thin-film silver layer 30 is deposited on the transparent polymer film 10.

The term "reflector" or "reflecting film" as used herein means an object which returns light, said light having entered it from a medium such as the atmosphere, back into the same medium, specifically, an object which returns 90% or more of light in the visible range back into the same medium. In the present invention, the term "reflector" or "reflecting film" more preferably means an object which returns 92% or more of light in the visible range back into the same medium.

Using FIG. 2, reflection by the reflecting film according to the present invention will be described in brief. Most of light 90 which has entered from a side of the transparent polymer film 10 passes through the transparent polymer film 10 and the treated surface 20, reaches the thin-film silver layer 30, is reflected back by the thin-film silver layer 30, passes through the treated surface 20 and the transparent polymer film 10 and then returns back to the same medium.

Use of reflecting films of the above-mentioned construction makes it possible to construct various reflectors which are suited for a wide variety of applications.

Figure 3:
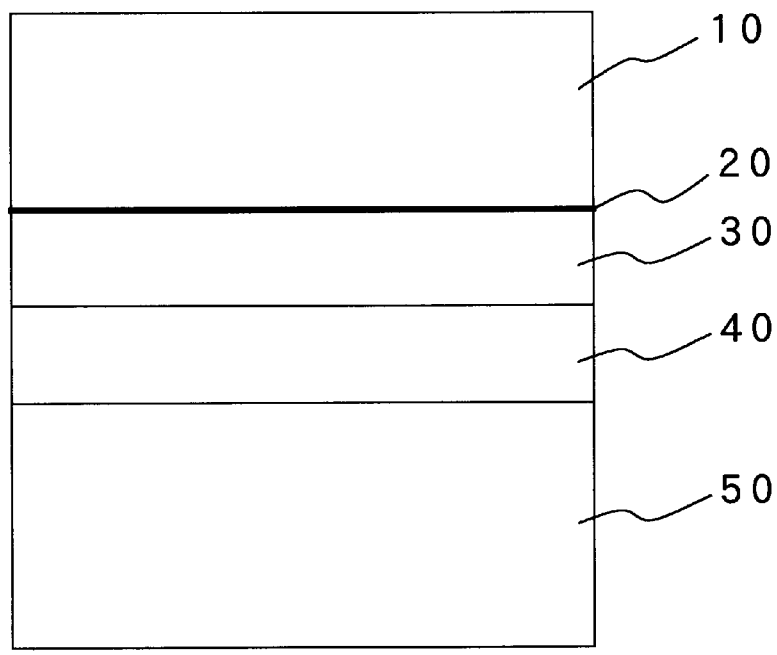
FIGS. 3, 4, 5, 6 and 7 are cross-sectional views which individually show the constructions of reflectors according to preferred embodiments of the present invention.

The reflector which is depicted in FIG. 3 has the construction that the reflecting film shown in FIG. 2 and a metal sheet 50 are laminated together via an adhesive layer 40. The thin-film silver layer 30 is in a contiguous relation with the adhesive layer 40. This reflector can be fabricated, for example, by applying surface treatment to one side of the transparent polymer film 10 with a metal-containing plasma to form a treated surface 20, depositing the thin-film silver layer 30 on the treated surface 20, coating the adhesive layer 40 on a surface of the thin-film silver layer 30 and then bonding the adhesive layer 40 and the metal sheet 50 together. In general, the lamination of the adhesive layer and the metal sheet is conducted in continuation with the coating of the adhesive. As an alternative, it is also possible to separately perform the coating step of the adhesive and the bonding step to the metal sheet. For example, when a thermoplastic polyester-base adhesive is used as an adhesive, the bonding can be performed at any desired time by causing the coated adhesive to fuse with a heated roller.

Figure 4:
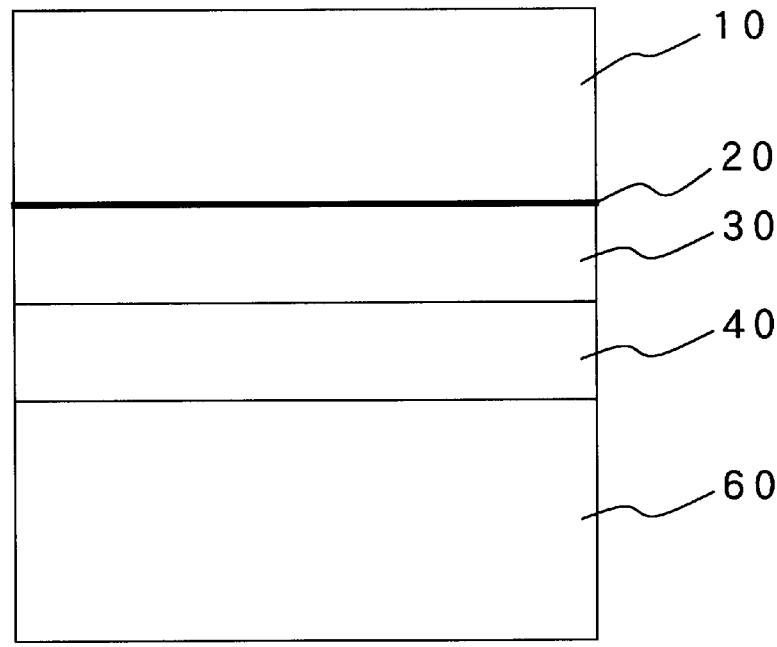

The reflector which is illustrated in FIG. 4 has the construction that the reflecting film shown in FIG. 2 and another polymer film 60 are laminated together via an adhesive layer 40. The thin-film silver layer 30 is in a contiguous relation with the adhesive layer 40. This reflector is similar to the reflector of FIG. 3 except for the replacement of the metal sheet by the polymer film 60. It can be fabricated in a similar manner as the reflector of FIG. 3.

Figure 5:
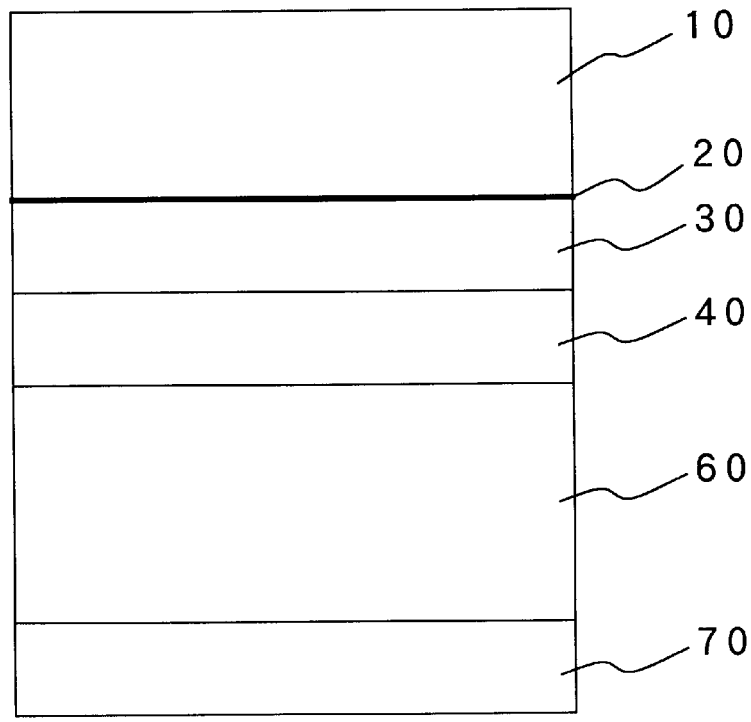

The reflector which is shown in FIG. 5 additionally includes a light-shielding layer 70 laminated further on the reflector of FIG. 4. The light-shielding layer 70 can be formed, for example, by coating.

Figure 6:
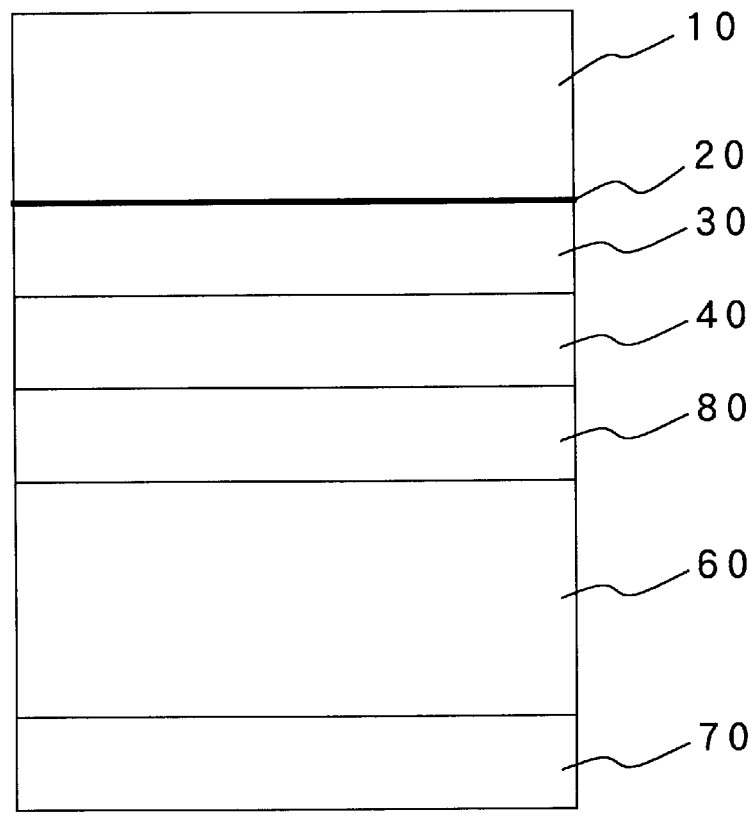

The reflector which is shown in FIG. 6 has the construction that a metal layer 80 is arranged between the adhesive layer 40 and the polymer film 60 in the reflector depicted in FIG. 5. This reflector can be fabricated by depositing beforehand the metal layer 80 on the polymer film 60 in accordance with vacuum evaporation or the like, arranging the polymer film 60 with the metal layer 80 located opposite the adhesive layer 40, bonding the reflector to the polymer film 60 via the adhesive layer 40, and then forming a light-shielding layer 70.

Figure 7:
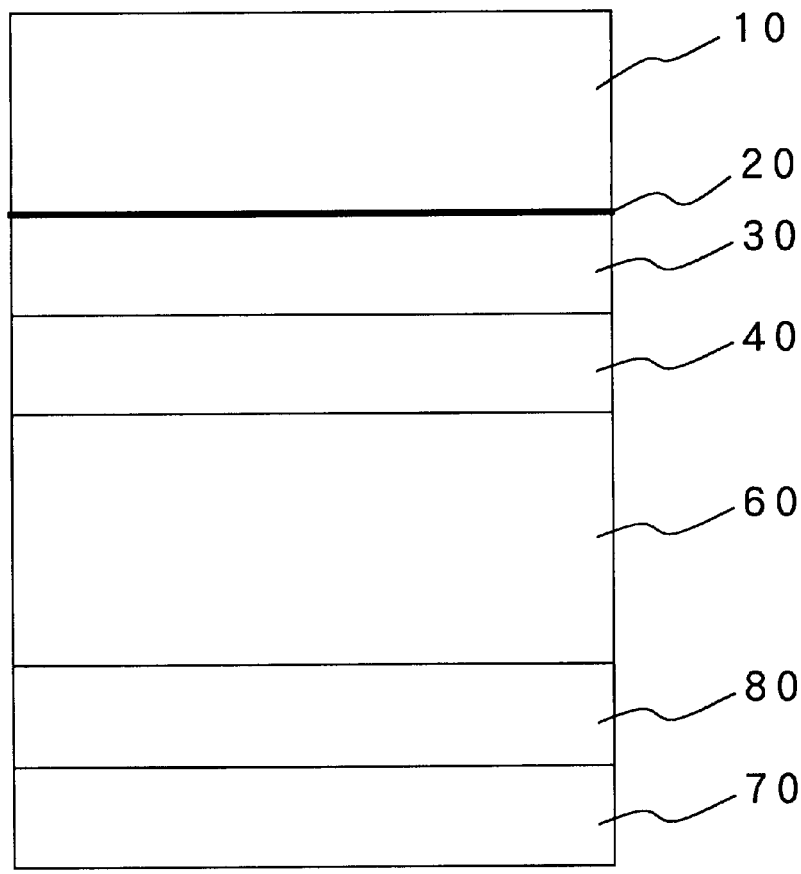

The reflector which is depicted in FIG. 7 has the construction that a metal layer 80 is arranged between the polymer film 60 and the light-shielding layer 70 in the reflector shown in FIG. 5. This reflector can be fabricated by depositing beforehand the metal layer 80 on the polymer film 60 in accordance with vacuum evaporation or the like, arranging the polymer film 60 with the metal-layer-free side located opposite the adhesive layer 40, and then bonding the reflecting film to the polymer film 60 via the adhesive layer 40.

For the transparent polymer film in the present invention, polyethylene (PE), polypropylene (PP), polystyrene (PS), polyethylene terephthalate (PET), polyethylene terenaphthalate (PEN), polybutylene terephthalate (PBT), polyethersulfones (PESs), polyetheretherketones (PEEKs), polycarbonates (PCs), polyimides (PIs), polyetherimides, cellulose triacetate resins, polyacrylate resins, polysulfone resins, fluorinated resins and the like can be used. It is however to be noted that the usable resin is not limited to them. Any desired resin can be used insofar as it has transparency and a somewhat higher glass transition temperature.

No particular limitation is imposed on the thickness of the transparent polymer film. It is however preferred to use a thickness of about 10 to 200 μm, more preferably a thickness of about 10 to 100 μm, still more preferably a thickness of about 25 to 50 μm.

As an optical property of the transparent polymer film employed in the present invention, it is preferred to have a transmission of 80% or higher for light whose wavelength is 550 nm. More preferably the light transmission for light whose wavelengths range from 500 to 600 nm is 80% or higher and, still more preferably, the light transmission for light whose wavelengths range from 400 to 800 nm is 80% or higher. A light transmission lower than 80% leads to a reflectance lower than 90% when constructed into a reflector, and is not preferred from the standpoint of the performance as a reflector.

Incidentally, to improve the light resistance of silver, it is preferred that the transparent polymer film has property to absorb ultraviolet rays. This has a already been disclosed by the present inventors in U.S. Pat. No. 5,276,600.

A transparent polymer films having a light transmittance of 10% or lower for light whose wavelengths ranges from 300 nm to 380 nm is a plastic film in which an ultraviolet absorber or the like has been incorporated or a plastic layer with an ultraviolet absorber, zinc oxide or the like formed thereon as a layer for blocking ultraviolet rays.

In particular, a PET film containing an ultra-violet absorber is preferable. Illustrative examples of the ultraviolet absorber include benzotriazole ultraviolet absorbers, benzophenone ultraviolet absorbers and salicylate-ester ultraviolet absorbers.

As a process for the formation of the thin-film silver layer, either a wet process or a dry process can be used. The term "wet process" is a term generic to plating processes, and means a process for causing silver to deposit in the form of a film from a solution. A specific example include a process making use of the silver mirror reaction. On the other hand, the term "dry process" is a term generic to vacuum film-forming processes. Specific examples include resistance-heating vacuum deposition, electron-beam-heating vacuum deposition, ion plating, ion-beam-assisted vacuum deposition, and sputtering. Among these, vacuum deposition is particularly preferred for use in the present invention because it permits film formation in a roll-to-roll manner, that is, in a continuous fashion.

According to vacuum deposition, silver is deposited on a surface of a substrate (polymer film), preferably at a pressure of 0.1 mTorr (about 0.01 Pa) or lower, by fusing a silver source material by an electron beam, resistance heating, induction heating or the like, and raising the vapor pressure of silver.

According to ion plating, silver is deposited on a surface of a substrate by introducing a gas such as argon of a pressure of 0.1 mTorr (about 0.01 Pa) or higher into a vacuum, inducing an RF or DC glow discharge, fusing a silver source material by an electron beam, resistance heating, induction heating or the like, and raising the vapor pressure of silver.

As a sputtering process, DC magnetron sputtering, RF magnetron sputtering, ion beam sputtering, ECR (electron cyclotron resonance) sputtering, conventional RF sputtering, conventional DC sputtering or the like can be used. Conventional sputtering means a sputtering process which is performed by arranging parallel-plate-type electrodes in a vacuum vessel. In sputtering, a plate-shaped target of silver can be used as a source material, and helium, neon, argon, krypton, xenon or the like can be used as a sputtering gas. However, use of argon is preferred. The purity of the sputtering gas is preferably 99% or higher, more preferably 99.5% or higher.

In the present invention, the thickness of the thin-film silver layer is preferably from 70 nm to 300 nm, more preferably from 100 nm to 200 nm. If the thin-film silver layer is unduly thin, the film thickness of silver is not sufficient so that some light is allowed to pass therethrough, leading to a reduction in reflectance. Even if the thin-film silver layer is unduly thick on the other hand, the reflectance does not increase and shows a tendency of saturation and, from the viewpoint of achieving effective use of silver resource, such an unduly large thickness is not preferred.

The thin-film silver layer may contain one or more metal impurities to an extent that no adverse effects will be given to the performance. These metal impurities include gold, copper, nickel, iron, cobalt, tungsten, molybdenum, tatalum, chromium, indium, manganese, titanium and aluminum. The purity of silver in the thin-film silver layer is preferably 99% or higher, more preferably 99.9% or higher, still more preferably 99.99% or higher.

Thickness measurement of each film such as the thin-film silver layer can be conducted using a tracer roughness meter, a multiple reflection interference meter, a microbalance, a quartz oscillator or the like. Of these, the method making use of the quartz oscillator permits thickness measurement of a film in the course of its formation and accordingly, is suited for obtaining a film of a desired thickness. Further, it is also possible to control the thickness of a film on the basis of the film-forming time by determining conditions for the formation of the film, conducting formation of a film on a test substrate and then investigating a relationship between the film-forming time and the film thickness, all, in advance to the formation of the first-mentioned film.

In the present invention, it is preferred to apply surface treatment with a metal-containing plasma to a transparent polymer film and then to form a thin-film silver layer on the treated surface. The application of such surface treatment in the present invention is considered to prevent photothermal deterioration which tends to occur at the interface between the transparent polymer film and the thin-film silver layer. This metal-containing plasma treatment will hereinafter be described in detail.

A metal-containing plasma can be obtained, for example, by introducing a discharge gas into a vacuum apparatus, forming a plasma by a DC glow discharge or an RF glow discharge and then introducing into the thus-formed plasma vapor particles of a metal which has been vaporized by an electron beam, resistance heating or induction heating. As an alternative, a metal-containing plasma can also be obtained by subjecting a metal halide, hydride or the like to a decomposition reaction in a plasma which has been formed by a glow discharge. As a further alternative, a metal-containing plasma can also be obtained by using a desired metal as a negative electrode and producing a plasma by a DC glow discharge or an RF glow discharge. As a simpler method, a metal-containing plasma can be obtained by conducting sputtering while using a desired metal as a negative electrode or by combining a conventional evaporation process other than those mentioned above (arc evaporation, laser evaporation, cluster ion beam evaporation, or the like) with a plasma formed by an RF glow discharge or a DC glow discharge.

Examples of metals, which are usable for the surface treatment by the metal-containing plasma in the present invention, include Ti, V, Cr, Mn, Fe, Co, Ni, Cu, Zn, Ga, Ge, Y, Zr, Nb, Mo, Rh, Pd, Cd, In, Sn, Sb, Te, Nd, Sm, Eu, Gd, Ta, W, Re, Os, Ir, Pt, Au, Pb, and Bi. Among these, Ti, W, Cr, V, Zn and Cu are preferred from the standpoint of exhibiting the especially advantageous effects of the present invention. Incidentally, use of Mg, Al or Si cannot achieve the objects of the present invention.

The surface treatment by the metal-containing plasma as referred to in the present invention can be achieved by exposing a surface of a transparent polymer film to a metal-containing plasma. During the exposure, the transparent polymer film may be cooled through the opposite surface (namely, the back side) so that the temperature of the film can be prevented from rising. Further, because use of a roll-to-roll apparatus makes it possible to continuously apply surface treatment with a metal-containing plasma to an elongated film, such a roll-to-roll apparatus is preferably employed for industrial-scale production.

The extent of treatment in the surface treatment by the metal-containing plasma can be expressed in terms of the amount of metal atoms deposited on the treated surface of the transparent polymer film. The amount of a metal which is deposited on the treated surface is preferably from $4\times10^{14}$ atoms/cm$^2$ to $2\times10^{16}$ atoms/cm$^2$, more preferably from $5\times10^{14}$ atoms/cm$^2$ to $1\times10^{16}$ atoms/cm$^2$, still more preferably from $1\times10^{15}$ atoms/cm$^2$ to $8\times10^{15}$ atoms/cm$^2$, notably from $2\times10^{15}$ atoms/cm$^2$ to $6\times10^{15}$ atoms/cm$^2$. An unduly small amount of the metal deposited on the treated surface cannot bring about any sufficient effects for photo-thermal deterioration prevention which is an object of the present invention. On the other hand, deposit of the metal in an unduly large amount on the treated surface results in a reduction in reflectance and hence fails to achieve a reflectance of 90% or higher, which is another object of the present invention.

The amount of a deposited metal can be measured by a film thickness monitor or the like. However, in an amount of metal atoms in a range such as that mentioned above, a deposited metal layer is not considered to be in the form of a continuous film. In general, the amount of a deposited metal is therefore calculated from the time of the surface treatment in view of the time required upon formation of a film having a thickness of about 100 nm which is reasonably considered to mean a continuous film. Described specifically, the number N of atoms of a metal deposited per unit area under certain specific conditions can be expressed by:

$$N = D \cdot \rho \cdot N_A / M \tag{1}$$

where D is the thickness of a metal layer deposited when surface treatment is conducted for a time t, $\rho$ and M are the density and atomic weight of the metal, respectively, and $N_A$ is the Avogadro's number. In particular, when nm is employed as the unit of the film thickness D, g/cm$^3$ as the unit of the density $\rho$ and atoms/cm$^2$ as the unit of the amount N of the deposited metal, the amount N of the deposited metal can be determined by:

$$N = D \cdot \rho \cdot 6.02 \times 10^{16} / M \tag{2}$$

To deposit the metal in a desired amount n (atoms/cm$^2$), it is therefore only necessary to conduct the surface treatment for a time represented by $t \cdot (n/N)$ under the same surface treatment conditions. When a film thickness monitor making use of a quartz oscillator is used, a frequency decrease which is required to actually deposit a metal in an amount as much as n (atoms/cm$^2$) can be calculated by $\delta f \cdot (n/N)$ where N (atoms/cm$^2$) represents the amount of the metal deposited when an observed decrease in frequency is $\delta f$(Hz). For a specific calculation example, assume that a surface treatment time of 1,000 seconds is required upon formation of a film having a thickness of 100 nm which is considered to be a continuous film of titanium atoms deposited when treatment with a titanium-containing plasma is applied to a surface of a PET film. From the formula (2), the amount of deposited titanium is about $6\times10^{17}$ atoms/cm$^2$. Accordingly, to deposit titanium atoms in an amount of $3\times10^{15}$ atoms/cm$^2$ on a surface of a PET film under the same plasma treatment conditions, the surface treatment time is calculated by 1000 (sec)·($3\times10^{15}$ (atoms/cm$^2$))/($6\times10^{17}$ (atoms/cm$^2$))=5 (sec). It is therefore only necessary to conduct the surface treatment for 5 seconds.

The following two points can be mentioned as important upon conducting surface treatment with a metal-containing plasma. Firstly, this surface treatment should not be conducted to such an extent that the reflectance of a reflector or reflecting film at the time of its fabrication, that is, its initial reflectance becomes 90% or lower. Secondly, the surface treatment should be applied to a surface of a transparent polymer film, said surface being the surface on which a thin-film silver layer is to be superposed, to an extent sufficient to prevent photothermal deterioration.

Incidentally, application of corona discharge treatment, glow discharge treatment, surface chemical treatment, roughening treatment or the like to a surface of a transparent polymer film prior to the surface treatment by the metal-containing plasma is considered to be a routine practice commonly conducted by those skilled in the art as a method for improving the adherence between the thin-film silver layer and the polymer film.

Figure 8:
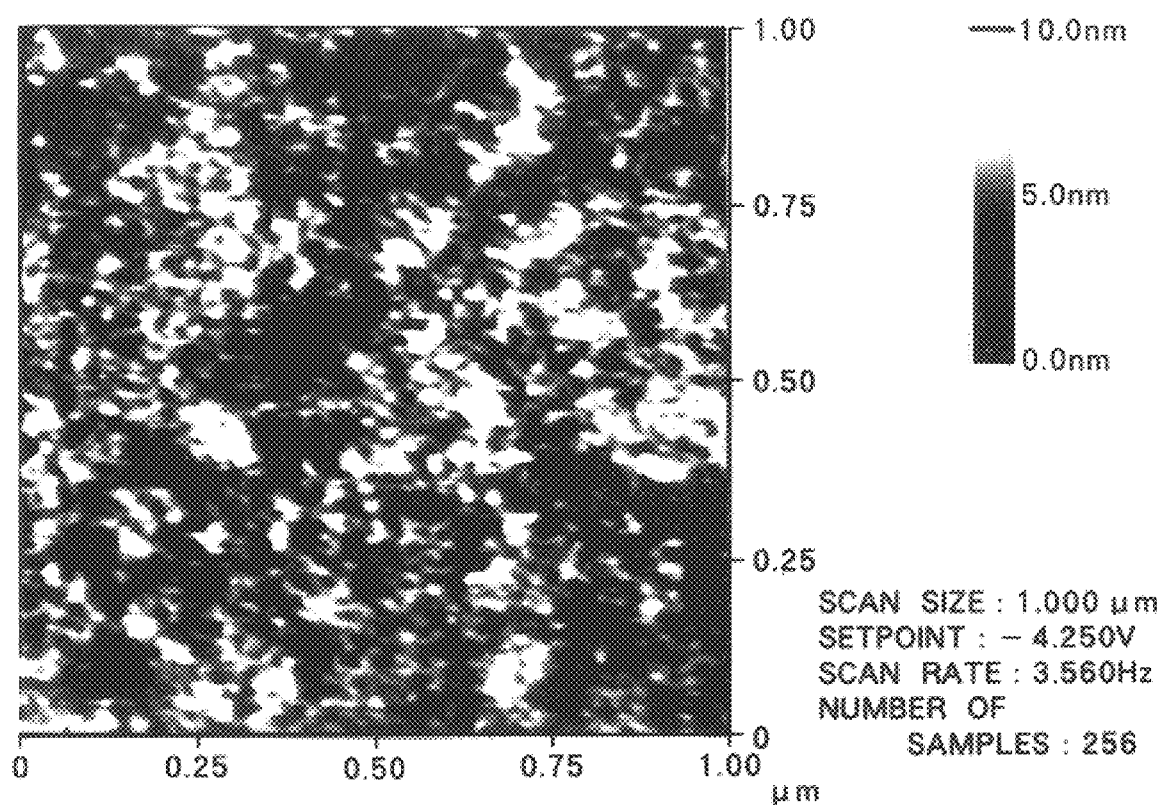
FIG. 8 is an AFM (Atomic Force Microscope) picture illustrating the nanostructure of a surface of a transparent polymer film not subjected to any plasma treatment.
Figure 9:
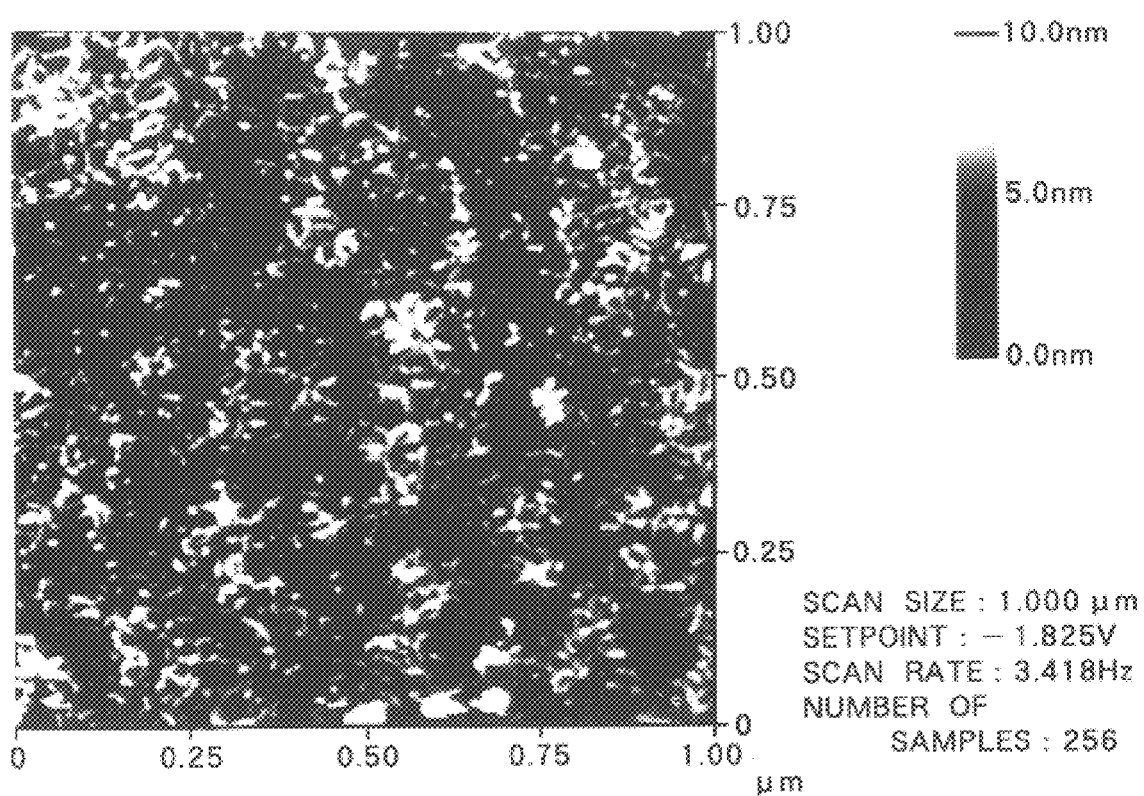
FIG. 9 is an AFM picture showing the nanostructure of a surface of a transparent polymer film subjected to surface treatment with a metal-containing plasma.

Details are not clear about how a surface of a transparent polymer film is changed by applying thereto surface treatment with a metal-containing plasma. By an atomic force microscope (AFM), the present inventors have however succeeded in determining the nanostructure of a surface treated by a metal-containing plasma. The AFM detects repulsion or attraction which acts between a free end of a probe, said free end having a shape of the order of atoms, and atoms in a surface, so that conditions of the surface shape can be determined. FIG. 8 is an AFM picture showing the nanostructure of a PET film surface not subjected to surface treatment, while FIG. 9 is an AFM picture of a PET film surface subjected to the above-described surface treatment. In FIG. 8, a trace like a scratch formed in the surface of the PET film by the probe of the AFM is observed, and no clear picture was obtained. In FIG. 9, on the other hand, there are no scratch made by the probe, and the picture was obtained in a clear form. The difference between the picture in FIG. 8 and that in FIG. 9 may intuitively be attributed to a reduction in the penetration of the probe because of a change to the hardness of the surface of the polymer film by the surface treatment. Physically, it may however be attributed to a change to the force which acts in the neighborhood of the surface between the probe and the surface. A comparison was therefore made between a curve of forces, which act between a surface of a surface-treated PET film and a probe (force curve), and a force curve of a PET film which has not been subjected to the surface treatment. It has been ascertained that the force curve of the untreated PET film presents extremely precipitous variations in the neighborhood of the surface but that of the treated PET film presents gentle variations. It has also been determined from FIG. 9 that the surface ruggedness of a PET film is about 10 nm in height.

The metal, which has deposited on the surface of the polymer film by the surface treatment with the metal-containing plasma, is considered to be localized on the surface because its amount is very small. Even if metal atoms are considered to regularly pile up layer after layer on a planar surface in an ideal manner, the metal atoms so piled up are as low as 0.5 layer to 10 layers or so, that is, are at most 0.1 to several nanometers in height insofar as the metal atoms are deposited in an amount of $5 \times 10^{14}$ to $1 \times 10^{16}$ atoms/cm$^2$. In contrast, the surface ruggedness of the PET film is as much as about 10 nm in height as mentioned above. It is therefore more reasonable to consider that in a surface of a transparent polymer film subjected to surface treatment with a metal-containing plasma, the metal may be deposited locally (for example, on functional groups of the polymer of the film). This deposition is considered to be in a rather preferred form. For example, L. J. Gerenser investigated reaction sites for silver atoms on a PET film, and concluded that silver atoms tend to react with carboxyl groups (Journal of Vacuum Science and Technology, A(8), 3682, 1990.

The amount of the metal deposited on the surface of the transparent polymer film can be measured, for example, by X-ray photoelectron spectrometry (XPS) or Rutherford backscattering spectrometry (RBS), inductively coupled plasma (ICP) emission spectrometry after dissolving the deposited metal, secondary ion mass spectrometry (SIMS), laser induced fluorometry (LIF) or X-ray fluorescence analysis (XRF). XPS is preferred from the practical viewpoint although use of ICP or RBS is preferred for accurate quantitation. When an actual measurement is performed by XPS, the amount of a deposited metal is assessed while taking a release depth of photoelectrons into consideration. Now assume that subsequent to treatment with a Ti-containing plasma, the surface concentration of Ti has been found to be 80% by XPS. Since the average depth of photo-electrons is 2 atom layers, Ti atoms can be assessed to have deposited in an amount of $3 \times 10^{15}$ (2 atom layers) $\times 0.8 = 2.4 \times 10^{15}$ atoms/cm$^2$. Incidentally, an advance calibration of measurement data of XPS by those of ICP makes it possible to improve the accuracy of XPS measurements.

After the application of the surface treatment to the transparent polymer film with the metal-containing plasma and the subsequent formation of the thin-film silver layer on the treated surface, it is effective—for the protection of the thin-film silver layer and also for the improvement of the sliding property of the film—to deposit a single metal such as chromium, nickel, titanium, aluminum, molybdenum or tungsten or an alloy such as Inconel, Incoloy, Monel, Hastelloy, stainless steel or duralumin in the form of a layer to a thickness of 10 nm to 30 nm on the thin-film silver layer.

The reflectance of the reflecting film or reflector according to the present invention fabricated as described above is preferably 90% or higher, more preferably 92% or higher, still more preferably 94% or higher.

Incidentally, the term "reflectance" as used herein means a value for light whose wavelength is 550 nm unless otherwise specifically indicated.

To investigate the degree of deterioration of each reflector subsequent to its exposure to light, the reflecting film is exposed at an exposure intensity of 500 mW/cm$^2$ to artificial sunlight from which light of 390 nm and shorter in wavelength has been eliminated. The term "artificial sunlight" means light having a spectrum similar to outdoor sunlight on a cloudless day. Described specifically, artificial sunlight is obtained by combining a xenon lamp with an optical filter. To eliminate light components of 390 nm and shorter in wavelength from the artificial sunlight, a UV cut filter is used. By eliminating light of 390 nm and shorter in wavelength and adjusting the setting so that the intensity of exposure to the UV-free artificial sunlight became about 500 mW/cm$^2$ on a surface of a sample, an accelerated photothermal deterioration test was conducted as will be described below. By conducting an accelerated photothermal deterioration test under such conditions, it becomes possible to cause, in a short time, photodeterioration which occurs at an interface between a transparent polymer film and a thin-film silver layer and may pose problems in industry.

It should however be noted here that, although the light irradiated in the accelerated photothermal deterioration test has been described to be artificial sunlight of the irradiation intensity of 500 mW/cm$^2$ from which rays of 390 nm and shorter in wavelength were eliminated, artificial sunlight actually employed in each accelerated photothermal deterioration test was artificial sunlight of an irradiation intensity of 500 mW/cm² from which ultraviolet rays had been cut off by using a UV cut filter whose transmission limit wavelength was 390 nm. Accordingly, the reflecting film according to the present invention is a reflecting film which retains a reflectance of at least 90% at a wavelength of 550 nm when the reflector is maintained at the temperature of 100° C. and is exposed at an exposure intensity of 500 mW/cm² to artificial sunlight from which ultraviolet rays have been cut off by using a UV cut filter whose transmission limit wavelength is 390 nm.

Figure 10:
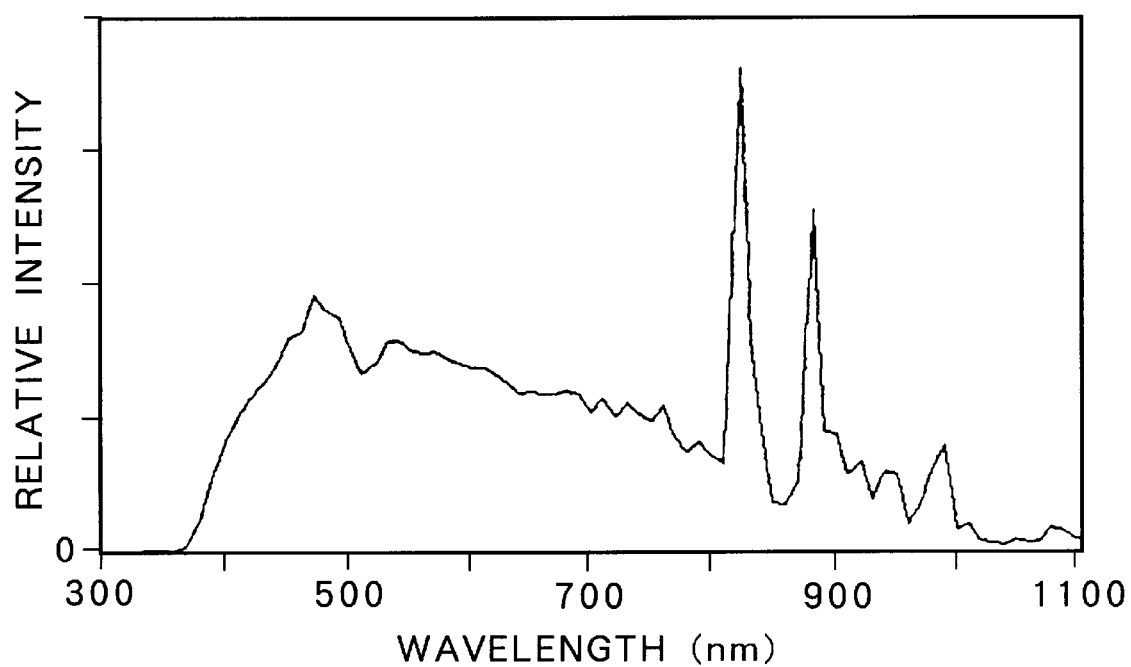
FIG. 10 is a graph showing a spectrum of artificial sunlight obtained through a UV cut filter whose transmission limit wavelength was 390 nm.

The term "transmission limit wavelength" is often expressed, for example, in terms of a middle value between a wavelength $\lambda_A$ at which the transmission becomes A% and another wavelength $\lambda_B$ at which the transmission becomes B% (for example, a middle value between a wave-length at which the transmission becomes 72% and a wavelength at which the transmission becomes 5%). As is known to those having ordinary skill in the art, these values are different from the values of wave-lengths which are actually eliminated. FIG. 10 illustrates the spectrum of artificial sunlight employed in subsequent examples, which was obtained through a UV cut filter whose transmission limit wavelength was 390 nm. In view of this spectrum, the irradiation light employed herein can be practically defined as light without ultraviolet rays of 360 nm and shorter.

Examples of the UV cut filter whose transmission limit wavelength is 390 nm include "Sharp Cut Filter #SCF-50S-39L" (trade name; manufactured by Sigma Koki K.K.; transmission limit wavelength: 390 nm; transmission at 360 nm wavelength: 1% max.) and "Sharp Cut Filter L-39" (trade name: manufactured by Toshiba Kasei Kogyo K.K.; transmission limit wavelength: 390 nm; transmission at 360 nm wavelength: 1% max.). They are substantially the same in optical characteristics. Whichever UV cut filter was employed, substantially the same test results were obtained.

The accelerated photothermal deterioration test was conducted by exposing each sample to the above light while heating the sample at 100° C. Deterioration is accelerated further by heating the sample at 100° C. The heating of the sample was conducted by arranging a plate-shaped heater underneath an aluminum plate, on which the sample was held, and controlling the temperature of the heater while measuring it by a thermocouple disposed in close contact with the aluminum plate.

The reflector according to the present invention has been formed by fixing the above-mentioned reflector of this invention on a base material, which typically comprises a metal sheet or polymer film, via an adhesive layer. The adhesive layer is composed of an adhesive or bonding material. Examples of the adhesive employed for the lamination with the metal sheet or polymer film, which also include bonding materials, include polyester-base adhesives, acrylic adhesives, urethane-base adhesives, silicone-base adhesives, epoxy-base adhesives and melamine-base adhesives. It is however borne in mind that the adhesive is not necessarily limited to the above-exemplified ones. Any desired adhesive or bonding material can be used insofar as it can provide practically-sufficient adhesion strength. As the adhesion strength, it is sufficient if a measurement value of 180° peel strength is 100 gf/cm, with 500 gf/cm being preferred and 1,000 gf/cm being more preferred. Unduly small adhesion strength is not preferred, because a problem like upward separation of the transparent polymer film from the metal sheet or polymer film may occur when the reflecting member is bent as a reflecting device at a curvature of radius of from 1 mm to 5 mm or so.

The thickness of the adhesive layer is preferably 0.5 $\mu$m to 50 $\mu$m, more preferably 1 $\mu$m to 20 $\mu$m, still more preferably 2 $\mu$m to 10 $\mu$m. An unduly large thickness results in a higher production cost in view of a higher material cost and is hence not preferred. On the other hand, an unduly small thickness cannot provide sufficient adhesion strength.

As a coating method of the adhesive, bar coating, Mayer bar coating, reverse coating, gravure coating, die coating or the like can be mentioned. These coating methods are selectively used in view of the kind and viscosity of the adhesive to be used, the coat weight, the coating speed, the surface conditions to be obtained, etc.

The reflector according to the present invention may be provided with a transparent protective layer on one side of the transparent polymer film, said one side being other than the surface on which the thin-film silver layer is arranged. By such a protective layer, effects of external environmental factors to the surface hardness, light resistance, gas resistance, water-proofness and the like of the reflector can be reduced further. Illustrative materials usable for the formation of such protective layers include organic materials, e.g., acrylic resins such as polymethyl methacrylate, polyacrylonitrile resin, polymethacrylonitrile resin, silicone resins such as polymers available from ethyl silicate, polyester resins, fluorine resins; and inorganic materials such as silicon oxide, zinc oxide and titanium oxide. Lamination of a protective layer which can prevent and limit the transmission of light having wavelengths of 400 nm and shorter, preferably, of 380 nm and shorter, desirably, to 10% or less is preferred from the standpoint of prevention of photodeterioration (ultraviolet deterioration) of the silver layer.

As a method for the formation of the transparent protective layer, a conventional method such as coating or lamination of a film can be mentioned. The transparent protective film is required to have such a thickness that it exhibits protecting effects without lowering the light-reflecting ability and impairing the flexibility. The thickness can vary depending on the material of the protective film and/or the application purpose.

Examples of the metal sheet employed as a base material include an aluminum sheet, aluminum alloy sheets, a brass sheet, a stainless steel sheet, and a steel sheet. The base material is not necessarily limited to them, and a desired base material can be selected depending on the application purpose of the reflector. For example, aluminum is light in weight and excellent in workability and owing to its high thermal conductivity, can effectively dissipate into the atmosphere heat applied to the reflector when employed as a base material. Aluminum can therefore be suitably employed in reflectors which are used in back-lights of liquid crystal displays (LCDS) for portable personal computers and the like. An aluminum alloy is light in weight and high in mechanical strength, so that it can be suitably used in reflectors which also serve as structural members. Stainless steel has high mechanical strength and excellent corrosion resistance, so that it can be suitably employed in reflectors for outdoor use and also for applications where a reduction in the thickness of a material is needed. Brass, that is, a copper-zinc alloy has high mechanical strength and on top of this advantage, features easy soldering, so that it is suitably used in reflectors which require electrical grounding. A steel sheet has a low price, so that it is suitably employed for applications where the manufacturing costs have priority, for example, in reflectors for fluorescent lamps and the like.

Regarding the thickness of the metal sheet as the base material, a smaller thickness is preferred from the viewpoints of a reduction in production cost and readiness in bending. On the other hand, from the viewpoints of handling ease and shape retainability upon lamination with a thin-film silver layer or the like, a larger thickness is better. The preferred thickness of the metal sheet ranges from 0.05 mm to 5 mm, with 0.1 mm to 1 mm being more preferred and 0.2 mm to 0.8 mm being still more preferred.

Examples of the polymer film employed as the base material include films which are made of homopolymers or copolymers such as polypropylene, polyethylene terephthalate (PET), polyethylene naphthalate (PEN), polybutylene terephthalate (PBT), acrylic resins, methacrylic resins, polyethersulfones (PESs), polyetheretherketones (PEEKs), polyacrylates, polyetherimides and polyimides. Particularly preferred is a polyethylene terephthalate film. When this polymer film is positioned as an outermost layer when constructed as a reflecting member, a white polymer film is preferred from the standpoint of an external appearance.

Regarding the thickness of the polymer film as the base material, a smaller thickness is preferred from the viewpoints of a reduction in production cost and readiness in bending. On the other hand, from the viewpoints of handling ease and shape retainability upon lamination with a thin-film silver layer or the like, a larger thickness is better. The preferred thickness of the polymer film ranges from 5 $\mu$m to 500 $\mu$m, with 10 $\mu$m to 200 $\mu$m being more preferred and 15 $\mu$m to 100 $\mu$m being still more preferred.

As the thin-film silver layer contains defects such as pinholes, light may transmit therethrough although the transmission is very limited. When a polymer film is employed as a base material, a metal layer and a light-shielding layer are used to block such light. To prevent reflection of light which has entered the reflector from the side of the base material, a light-shielding layer can also be employed. For the metal layer, Al, Cr or the like is used. As the light-shielding layer, a white coating formulation containing a white pigment dispersed in a resin can be used. Examples of the white pigment include alumina, titania (titanium white), lead oxide (lead white), zinc oxide (zinc white), calcium carbonate, barium carbonate, barium sulfate, potassium titanate, and sodium silicate. Examples of the resin as a dispersion medium for the pigment include acrylic resins, polyester resins and urethane resins or the like.

A description will hereinafter be made of certain representative evaluation methods for the constructions and compositions of reflecting films and reflectors as products of the present invention. The thickness of each of a thin-film silver layer, an adhesive layer and a base material can be directly measured by observing its cross-section through a transmission electron microscope (TEM). An analysis of the material of a polymer film can be conducted by performing an infrared (IR) spectrometric analysis. Further, an analysis of the material of an adhesive can be conducted by peeling off the thin-film silver layer and the base material to expose the adhesive, dissolving the adhesive in an appropriate solvent to prepare a sample, and then performing an infrared (IR) spectrometric analysis of the sample. Analyses of the materials of the thin-film silver layer and the base material can be conducted by X-ray fluorescence spectrometry (XRF). In addition, an electron probe microanalyzer (EPMA) can perform an elemental analysis of a smaller area than X-ray fluorescence spectrometry (XRF). If the thin-film silver layer is exposed by peeling off the polymer film with the thin-film silver layer formed thereon from the adhesive layer, the composition of the thin-film silver layer can be analyzed by Auger electron spectroscopy (AES) and its thickness can also be known by determining its depth profile.

There are various methods for the measurement of a reflectance. In the examples to be described subsequently herein, reflectances were measured by providing a spectrophotometer with an integrating sphere. Further, the light transmittance of a transparent polymer film or the like can be measured, for example, by providing a HITACHI automated self-recording spectrophotometer (model: U-3400) with a film holder (model: 210-2112) and holding the transparent polymer film as a sample on the film holder.

The present invention will hereinafter be described based on the following examples.

Each accelerated photothermal deterioration test was conducted by using, at an exposure intensity of 500 mW/cm$^2$, artificial sunlight from which light of 390 nm and shorter in wavelength had been eliminated. Further, each reflector was heated at 100° C. As a light source, a solar simulator (model: YSS-505H; manufactured by Yamashita Denso K.K.) was used. In addition, a "Sharp Cut Filter L-39" (trade name; manufactured by Toshiba Kasei Kogyo K.K.) was used to eliminate light of 390 nm and shorter in wavelength.

The reflectance of each reflector was measured by providing the HITACHI automated self-recording spectrophotometer (model: U-3400) with an integrating sphere whose diameter was 150 mm. As a reference, a standard white plate made of aluminum oxide was used.

The light transmittance of each transparent polymer film was measured by providing the HITACHI automated self-recording spectrophotometer (model: U-3400) with the film holder (model: 210-2112) and holding the transparent polymer film as a sample on the film holder.

EXAMPLE 1

Argon of 99.5% purity was introduced as a discharge gas to 2×10$^{-3}$ Torr in a vacuum vessel, followed by the production of a plasma by a DC glow discharge. At that time, titanium was used as a negative electrode so that a plasma atmosphere containing titanium was produced. Using the titanium-containing plasma, a transparent polymer film [polyethylene terephthalate (PET) film, product of Teijin Limited; "Tetron Film Type HB3" (trade name); thickness: 25 $\mu$m; light transmittance: 87.3%] was subjected at one side thereof to surface treatment so that titanium was allowed to deposit in an amount of 5×10$^{14}$ atoms/cm$^2$ on the surface of the film. Using silver of 99.9% purity as a material to be vaporized, silver was then caused to deposit to a thickness of 150 nm on the plasma-treated surface by vacuum evaporation. The reflectance (namely, initial reflectance) of the sample so obtained was measured from the side of the transparent polymer film. The reflectance was found to be 95.5%. After an accelerated photothermal deterioration test was conducted for 300 hours, the reflectance was measured again. The reflectance was found to be 91.5%.

EXAMPLE 2

A sample was produced in a similar manner to Example 1 except that the treatment was conducted to deposit titanium in an amount of 5×10$^{15}$/cm$^2$ on the surface. The reflectance of the sample so obtained was measured from the side of the transparent polymer film. The reflectance was found to be 95.4%. After an accelerated photothermal deterioration test was conducted for 300 hours, the reflectance was measured again. The reflectance was found to be 94.7%.

EXAMPLE 3

A sample was produced in a similar manner to Example 1 except that the treatment was conducted to deposit titanium in an amount of 1×10$^{16}$/cm$^2$ on the surface. The reflectance of the sample so obtained was measured from the side of the transparent polymer film. The reflectance was found to be 91.1%. After an accelerated photothermal deterioration test was conducted for 300 hours, the reflectance was measured again. The reflectance was found to be 91.0%.

EXAMPLE 4

Argon of 99.5% purity was introduced as a discharge gas to $2\times10^{-3}$ Torr in a vacuum vessel, followed by the production of a plasma by a DC glow discharge. At that time, titanium was used as a negative electrode so that a plasma atmosphere containing titanium was produced. Using the titanium-containing plasma, a transparent polymer film (a PET film, product of Teijin Limited; "Tetron Film Type HB3", trade name; thickness: 25 µm; light transmittance: 87.3%) was subjected at one side thereof to surface treatment so that titanium was allowed to deposit in an amount of $5\times10^{15}$ atoms/cm$^2$ on the surface of the film. Using silver of 99.9% purity as a target and argon of 99.5% purity as a sputtering gas, silver was then caused to deposit to a thickness of 150 nm on the plasma-treated surface by DC magnetron sputtering. The reflectance (namely, initial reflectance) of the sample so obtained was measured from the side of the transparent polymer film. The reflectance was found to be 95.6%. After an accelerated photothermal deterioration test was conducted for 300 hours, the reflectance was measured again. The reflectance was found to be 95.4%.

EXAMPLE 5

A sample was produced in a similar manner to Example 4 except that as the transparent polymer film (a PET film, product of Toyobo Co., Ltd., "Type A4100", trade name; thickness: 25 µm; light transmittance: 87.6%) was used. The reflectance of the sample so obtained was measured from the side of the transparent polymer film. The reflectance was found to be 96.0%. After an accelerated photothermal deterioration test was conducted for 300 hours, the reflectance was measured again. The reflectance was found to be 96.0%.

EXAMPLE 6

A sample was produced in a similar manner to Example 5 except that vanadium of 99.9% purity was used instead pf the titanium. The reflectance of the sample so obtained was measured from the side of the transparent polymer film. The reflectance was found to be 94.7%. After an accelerated photothermal deterioration test was conducted for 300 hours, the reflectance was measured again. The reflectance was found to be 94.3%.

EXAMPLE 7

A sample was produced in a similar manner to Example 5 except that chromium of 99.9% purity was used instead of the titanium. The reflectance of the sample so obtained was measured from the side of the transparent polymer film. The reflectance was found to be 95.7%. After an accelerated photothermal deterioration test was conducted for 300 hours, the reflectance was measured again. The reflectance was found to be 91.6%.

EXAMPLE 8

A sample was produced in a similar manner to Example 5 except that copper of 99.99% purity was used instead of the titanium. The reflectance of the sample so obtained was measured from the side of the transparent polymer film. The reflectance was found to be 95.2%. After an accelerated photothermal deterioration test was conducted for 300 hours, the reflectance was measured again. The reflectance was found to be 95.0%.

EXAMPLE 9

A sample was produced in a similar manner to Example 5 except that zinc of 99.9% purity was used instead of the titanium. The reflectance of the sample so obtained was measured from the side of the transparent polymer film. The reflectance was found to be 95.0%,. After an accelerated photothermal deterioration test was conducted for 300 hours, the reflectance was measured again. The reflectance was found to be 94.7%.

EXAMPLE 10

A sample was produced in a similar manner to Example 5 except that tungsten of 99.9% purity was used instead of the titanium. The reflectance of the sample so obtained was measured from the side of the transparent polymer film. The reflectance was found to be 95.5%. After an accelerated photothermal deterioration test was conducted for 300 hours, the reflectance was measured again. The reflectance was found to be 95.4%.

COMPARATIVE EXAMPLE 1

Using silver of 99.9% purity as a material to be vaporized, silver was caused to deposit to a thickness of 150 nm by vacuum evaporation on a transparent polymer film (a PET film, product of Teijin Limited; "Tetron Film Type HB3", trade name; thickness: 25 µm; light transmittance: 87.3%). The reflectance of the sample so obtained was measured from the side of the transparent polymer film. The reflectance was found to be 96.0%. The initial reflectance was hence 96.0%, that is, sufficient. However, after an accelerated photothermal deterioration test was conducted for 300 hours, the reflectance was found to be as low as 51.2%. The sample was therefore no longer suited as a reflector.

COMPARATIVE EXAMPLE 2

Using silver of 99.9% purity as a target and argon of 99.5% purity as a sputtering gas, silver was caused to deposit to a thickness of 150 nm by DC magnetron sputtering on a transparent polymer film (a PET film, product of Toyobo Co., Ltd.; "Type A4100", trade name; thickness: 25 µm; light transmittance: 87.6%). The reflectance of the sample so obtained was measured from the side of the transparent polymer film. The reflectance was found to be 96.1%. After an accelerated photothermal deterioration test was conducted for 300 hours, the reflectance was measured again. The reflectance was found to be 60.2%. Although the initial reflectance was as high as 96.1%, that is, sufficient, the reflectance after the accelerated photothermal deterioration test was as low as 60.2%. The sample was therefore no longer suited as a reflector.

COMPARATIVE EXAMPLE 3

A sample was produced in a similar manner to Example 1 except that the treatment was conducted to deposit titanium in an amount of $5\times10^{16}$/cm$^2$ on the surface. The reflectance of the sample so obtained was measured from the side of the transparent polymer film. The reflectance was found to be 82.9%. The initial reflectance was so low that the sample was not suited as a reflector.

COMPARATIVE EXAMPLE 4

A sample was produced in a similar manner to Example 5 except that magnesium of 99.9% purity was used instead of the titanium. The reflectance of the sample so obtained was measured from the side of the transparent polyper film. The reflectance was found to be 95.8%. After an accelerated photothermal deterioration test was conducted for 300 hours, the reflectance was measured again. The reflectance was found to be 31.2%. Although the initial reflectance was as high as 95.8%, that is, sufficient, the reflectance after the accelerated photothermal deterioration test was as low as 31.2%. The sample was therefore no longer suited as a reflector.

COMPARATIVE EXAMPLE 5

A sample was produced in a similar manner to Example 5 except that aluminum of 99.9% purity was used instead of the titanium. The reflectance of the sample so obtained was measured from the side of the transparent polymer film. The reflectance was found to be 96.2%. After an accelerated photothermal deterioration test was conducted for 300 hours, the reflectance was measured again. The reflectance was found to be 24.9%. Although the initial reflectance was as high as 96.2%, that is, sufficient, the reflectance after the accelerated photothermal deterioration test was as low as 24.9%. The sample was therefore no longer suited as a reflector.

COMPARATIVE EXAMPLE 6

A sample was produced in a similar manner to Example 5 except that silicon of 99.9% purity was used instead of the titanium. The reflectance of the sample so obtained was measured from the side of the transpar-ent polymer film. The reflectance was found to be 96.2%. After an accelerated photothermal deterioration test was conducted for 300 hours, the reflectance was measured again. The reflectance was found to be 29.2%. Although the initial reflectance was as high as 96.2%, that is, sufficient, the reflectance after the accelerated photothermal deterioration test was as low as 29.2%. The sample was therefore no longer suited as a reflector.

The results of the above examples and comparative examples are summarized in the following table:

TABLE

| | Metal used in plasma surface treatment | Amount of deposited metal (atoms/cm$^2$) | Initial reflectance | Reflectance after accelerated photothermal deterioration test |
|---|---|---|---|---|
| Ex. 1 | Ti | 5 × 10$^{14}$ | 95.5% | 91.5% |
| Ex. 2 | Ti | 5 × 10$^{15}$ | 95.4% | 94.7% |
| Ex. 3 | Ti | 1 × 10$^{16}$ | 91.1% | 91.0% |
| Ex. 4 | Ti | 5 × 10$^{15}$ | 95.6% | 95.4% |
| Ex. 5 | Ti | 5 × 10$^{15}$ | 96.0% | 96.0% |
| Ex. 6 | V | 5 × 10$^{15}$ | 94.7% | 94.3% |
| Ex. 7 | Cr | 5 × 10$^{15}$ | 95.7% | 91.6% |
| Ex. 8 | Cu | 5 × 10$^{15}$ | 95.2% | 95.0% |
| Ex. 9 | Zn | 5 × 10$^{15}$ | 95.0% | 94.7% |
| Ex. 10 | W | 5 × 10$^{15}$ | 95.5% | 95.4% |
| Comp. Ex.1 | None | — | 96.0% | 51.2% |
| Comp. Ex.2 | None | — | 96.1% | 60.2% |
| Comp. Ex.3 | Ti | 5 × 10$^{16}$ | 82.9% | — |
| Comp. Ex.4 | Mg | 5 × 10$^{15}$ | 95.8% | 31.2% |
| Comp. Ex.5 | Al | 5 × 10$^{15}$ | 96.2% | 24.9% |
| Comp. Ex.6 | Si | 5 × 10$^{15}$ | 96.2% | 29.2% |

Figure 11:
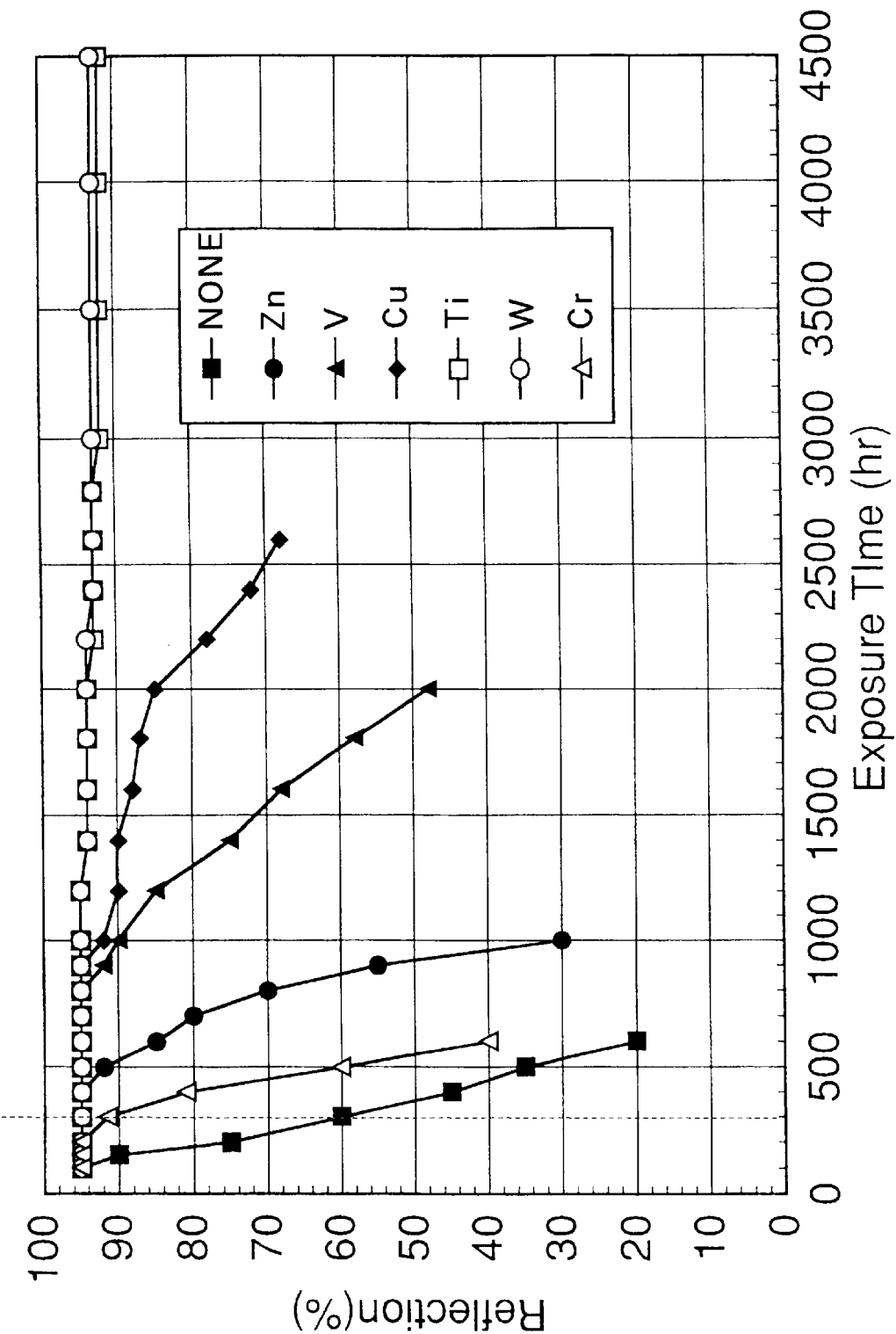
FIG. 11 is a graph illustrating one example of a relationship between the time of exposure of a reflecting film to light and the reflectance of the reflector.

From the above results, it is understood that the treatment of a surface of a transparent polymer film by a plasma containing Ti, V, Cr, Cu, Zn or W can suppress a reduction in reflectance due to photothermal deterioration and can maintain a reflectance of 90% or higher even after an accelerated photothermal deterioration test is conducted for 300 hours. With respect to the samples obtained in Examples 5 to 10 and Comparative Example 2, variations in reflectance were investigated along the passage of time in their accelerated photothermal deterioration tests. The results are shown in FIG. 11, in which elapsed test time is plotted along the abscissa while reflectance is plotted along the ordinate. It is appreciated form the diagram that, as a metal for use in the surface treatment with a metal-containing plasma, W and Ti are the best and are followed by Cu, V, Zn and Cr.

What is claimed is:

1. A reflecting film having at least a transparent polymer film and a thin silver layer applied on said transparent polymer film to reflect light entered from a side of said transparent polymer film, wherein said reflecting film retains a reflectance of at least 90% to visible light even after said reflecting film is exposed for 300 hours at a temperature of 100° C. and an exposure intensity of 500 mW/cm$^2$ to artificial sunlight from which light of 390 nm and shorter in wavelength has been eliminated, wherein said transparent polymer film is subjected on one side thereof to surface treatment with a metal-containing plasma to provide a treated surface and said thin silver layer is then formed on said treated surface, and wherein an amount of metal atoms deposited per unit area on said treated surface of said transparent polymer film by said surface treatment ranges from 4×10$^{14}$ atoms/cm$^2$ to 2×10$^{16}$ atoms/cm$^2$.

2. A reflecting film according to claim 1, wherein the reflectance to visible light is a whole light reflectance to light having a wavelength of 550 nm.

3. A reflecting film according to claim 1, wherein said transparent polymer film is a polyethylene terephthalate film.

4. A reflecting film according to claim 1, wherein said metal is a metal selected from titanium, vanadium, chromium, copper, zinc or tungsten.

5. A reflecting film according to claim 4, wherein said metal is selected from titanium or tungsten.

6. A reflecting film according to claim 1, wherein said transparent polymer film has a light transmittance of not greater than 10% to light having a wavelength in the range of from 300 nm to 380 nm.

7. A reflector comprising a base material and a reflecting film according to claim 1, wherein said reflecting film is applied to said base material via an adhesive layer with said thin silver layer of said reflecting film being in contiguous relation with said adhesive layer.

8. A reflector according to claim 7, wherein said base material is selected from a metal sheet or a polymer film.

9. A reflector according to claim 7, wherein said base material is a base material selected from an aluminum sheet, a brass sheet, a stainless steel sheet or a steel sheet.

10. A reflector according to claim 7, wherein said transparent polymer film has a light transmittance of not greater than 10% to light having a wavelength in the range of from 300 nm to 380 nm.

11. A reflector comprising a reflecting film according to claim 1, an adhesive layer, a polymer film and a light-shielding layer stacked one over another in this order with said thin silver layer of said reflecting film being in contiguous relation with said adhesive layer.

12. A reflector comprising a reflecting film according to claim 1, an adhesive layer, a metal layer, a polymer film and a light-shielding layer stacked one over another in this order with said thin silver layer of said reflecting film being in contiguous relation with said adhesive layer.

13. A reflector comprising a reflecting film according to claim 1, an adhesive layer, a polymer film, a metal layer and a light-shielding layer stacked one over another in this order with said thin silver layer of said reflecting film being in contiguous relation with said adhesive layer.

14. A reflecting film having at least a transparent polymer film and a thin silver layer applied on said transparent polymer film to reflect light entered from a side of said transparent polymer film, wherein said reflecting film retains a reflectance of at least 90% to visible light even after said reflecting film is exposed for 300 hours at a temperature of 100° C. and an exposure intensity of 500 mW/cm$^2$ to artificial sunlight from which light of 390 nm and shorter in wavelength has been eliminated, and wherein said transparent polymer film is subjected on one side thereof to surface treatment with a metal-containing plasma to provide a treated surface and said thin silver layer is then formed on said treated surface.

15. A reflecting film according to claim 14, wherein an amount of metal atoms deposited per unit area on said treated surface of said transparent polymer film by said surface treatment ranges from $1 \times 10^{15}$ atoms/cm$^2$ to $8 \times 10^{15}$ atoms/cm$^2$.

16. A reflecting film according to claim 14, wherein said metal is a metal selected from titanium, vanadium, chromium, copper, zinc or tungsten.

17. A reflecting film according to claim 16, wherein said metal is selected from titanium or tungsten.

18. A reflecting film according to claim 14, wherein said transparent polymer film has a light transmittance of not greater than 10% to light having a wavelength in the range of from 300 nm to 380 nm.

19. A reflector comprising a base material and a reflecting film according to claim 14, wherein said reflecting film is applied to said base material via an adhesive layer with said thin silver layer of said reflecting film being in contiguous relation with said adhesive layer.

20. A reflector according to claim 19, wherein said base material is selected from a metal sheet or a polymer film.

21. A reflector according to claim 19, wherein said base material is a base material selected from an aluminum sheet, a brass sheet, a stainless steel sheet or a steel sheet.

22. A reflector according to claim 19, wherein said transparent polymer film has a light transmittance of not greater than 10% to light having a wavelength in the range of from 300 nm to 380 nm.

23. A reflector comprising a reflecting film according to claim 14, an adhesive layer, a polymer film and a light-shielding layer stacked one over another in this order with said thin silver layer of said reflecting film being in contiguous relation with said adhesive layer.

24. A reflector comprising a reflecting film according to claim 14, an adhesive layer, a metal layer, a polymer film and a light-shielding layer stacked one over another in this order with said thin silver layer of said reflecting film being in continuous relation with said adhesive layer.

25. A reflector comprising a reflecting film according to claim 14, an adhesive layer, a polymer film, a metal layer and a light-shielding layer stacked one over another in this order with said thin silver layer of said reflecting film being in continuous relation with said adhesive layer.

* * * * *